United States Patent
Krupinski

(10) Patent No.: US 6,420,444 B1
(45) Date of Patent: Jul. 16, 2002

(54) TETRAFUNCTIONAL INITIATOR

(75) Inventor: Steven M. Krupinski, Pittsburgh, PA (US)

(73) Assignee: Nova Chemicals, Inc., Moon Township, PA (US)

(*) Notice: Subject to any disclaimer, the term of this patent is extended or adjusted under 35 U.S.C. 154(b) by 20 days.

(21) Appl. No.: 09/836,611

(22) Filed: Apr. 16, 2001

Related U.S. Application Data

(62) Division of application No. 09/678,910, filed on Oct. 4, 2000.

(51) Int. Cl.$^7$ .................................................. C08J 9/00
(52) U.S. Cl. .......................... 521/146; 521/79; 521/81; 521/139; 521/147
(58) Field of Search .................. 521/146, 147, 521/79, 81, 139; 526/230.5, 346

(56) References Cited

U.S. PATENT DOCUMENTS

| | | |
|---|---|---|
| 2,848,427 A | 8/1958 | Rubens |
| 2,848,428 A | 8/1958 | Rubens |
| 3,960,784 A | 6/1976 | Rubens |
| 4,424,287 A | 1/1984 | Johnson et al. |
| 5,250,577 A | 10/1993 | Welsh |
| 5,266,602 A | 11/1993 | Walter et al. |
| 5,576,094 A | 11/1996 | Callens et al. |
| 5,760,149 A | 6/1998 | Sanchez et al. |
| 5,830,924 A | 11/1998 | Suh et al. |

FOREIGN PATENT DOCUMENTS

AU           529339        11/1979

OTHER PUBLICATIONS

L.C. Rubens, Some Effects of Crosslinking Upon the Foaming Behavior of Heat Plastified Polystyrene, Journal of Cellular Plastics, Apr., 1965, pp. 311–320.

*Primary Examiner*—Morton Foelak
(74) *Attorney, Agent, or Firm*—Kenneth H. Johnson

(57) ABSTRACT

The melt of polyvinyl aromatic polymers comprising from 10 to 45 weight % of star branched polymer prepared using a combination of thermal and tetra functional peroxide initiation has an improved melt strength permitting better foam formation for extrusion foam blown with conventional blowing agents and inert gases including $CO_2$.

13 Claims, No Drawings

TETRAFUNCTIONAL INITIATOR

This application is a divisional of Ser. No. 09/678,910 filed Oct. 4, 2000.

FIELD OF THE INVENTION

The present invention relates to polymeric foams. More particularly the present invention relates to foams of vinyl aromatic polymers that comprise from 10 to 45 weight % of a star branched vinyl aromatic polymer.

BACKGROUND OF THE INVENTION

In the manufacture of extrusion foam there are competing factors to balance. One needs to consider the viscosity or melt flow rate of the polymer as it impacts on the extruder output and the melt strength of the polymer, and particularly of the foaming mass as it leaves the extruder as this impacts on the bubble stability or the foam stability. If one makes a very low viscosity polymer it will flow through the extruder easily. However a low viscosity polymer tends to have a low melt strength and the resulting foam tends to have a lower stability. Accordingly, there is a tendency for foams of low viscosity to collapse upon extrusion or shortly after leaving the extruder.

It has been known for some time that the melt strength of a polymer may be improved by lightly cross linking the polymer. The paper "Some Effects of Crosslinking Upon the Foaming Behavior of Heat Plastified Polystyrene", L. C. Rubens *Journal of Cellular Plastics,* April 1965, 311–320 discloses that polystyrene, containing small amounts (about 0.03 weight %) of divinyl benzene, may be foamed with $CO_2$ and the polymer has good foam stability and good foam volume. This technology is also the subject matter of U.S. Pat. Nos. 2,848,427 and 2,848,428 issued Aug. 19, 1958 to Louis C. Rubens assigned to The Dow Chemical Company. The technology comprised forming a cross linked polystyrene polymer then impregnating it in solid state with $CO_2$ then releasing the pressure and letting the polymer expand. This technology was not strongly relevant to extrusion foam techniques.

The cross linking technology was further applied in U.S. Pat. No. 3,960,784 issued Jun. 1, 1976 to Louis C. Rubens assigned to The Dow Chemical Company. This patent teaches concurrent impregnation of a polymer with a blowing agent and a cross linking agent. The polystyrene is prepared at temperatures from about 60° C. to 120° C., preferably from about 70° C. to 100° C. (Column 3 lines 25–26). These temperature ranges are indicative of suspension polymerization and concurrent or post polymerization impregnation with the blowing agent and cross linking agent (see Example 3) although the polymer could be molded into thin sheets for the impregnation step. This reference does not teach an extrusion foam.

While divinyl benzene is useful in suspension polymerization it tends to produce gels in bulk or solution polymerization. In a bulk or solution polymerization the use of tetra functional initiators significantly reduces gels. Typically no or very low levels (e.g. less than 0.5 weight %, more generally less than 0.1 weight %) of gels (i.e. insoluble polymer in typical solvents).

With the Montreal protocol on reducing the use of CFC's and HCFC's and regulations regarding the permissible discharge of volatile organic compounds (VOC's) there was increase pressure on polymer foam industry to move to other blowing agents such as $CO_2$ or $N_2$. Representative of this type of art is Monsanto's Australian Patent 529339 allowed Mar. 17, 1983. The patent teaches the formation of a foam by extruding polystyrene and injecting $CO_2$ into the extruder. Interestingly there is no mention of cross linking agents or branched polystyrene in the patent. U.S. Pat. No. 5,250,577 issued Oct. 5, 1993 to Gary C. Welsh is similar as it pertains to extrusion foaming polystyrene in an extrusion process using $CO_2$ as the sole blowing agent. Again there is no reference in U.S. Pat. No. 5,250,577 to the use of cross linking agents.

At about this time U.S. Pat. No. 5,266,602 issued to Walter et al. assigned to BASF. The patent teaches foaming a branched polystyrene. The foaming agent is conventional (e.g. $C_{4-6}$ alkanes). The polymer is prepared in the presence of a peroxide initiator other than a benzoyl compound and a moderator (chain transfer agent) such as a mercaptan (e.g. t-dodecyl mercaptan) and a "branching agent". The branching agent contains a second unsaturation as a point for the polymer to branch. Suitable agents include divinyl benzene, butadiene and isoprene. These types of branching agents would not produce the star branched polymers referred to herein. The actual polymerization process appears to be a suspension process. Additionally there is no reference in the disclosure to blowing the polystyrene with anything other than conventional alkane blowing agents.

U.S. Pat. No. 5,576,094 issued Nov. 19, 1996 to Callens et al. assigned to BASF teaches extruding slab foamed polystyrene blown with $CO_2$ or a mixture of $CO_2$ and $C_{1-6}$ alcohols or ethers of $C_{1-4}$ alkyl alkoxy compounds. The polystyrene is a branched polystyrene preferably having at least 50%, more preferably 60% of the polymer being a star branched styrene butadiene block polymer. The polymer has a VICAT softening temperature not greater than 100° C. This teaches against the subject matter of the present invention. Additionally the polymer has a melt index MVI 200/5 of at least 5 mL/10 minutes.

U.S. Pat. No. 5,830,924 issued Nov. 3, 1998 to Suh et al. assigned to The Dow Chemical Company claims a process for extruding a closed cell foam using $CO_2$ or a mixture of $CO_2$, conventional alkane blowing agents and a polystyrene in which from 50 to 100 weight % of the polystyrene is star branched (i.e. branched). This teaches away from the subject matter of the present invention which requires a different type of polymer and lower weight % of star branched vinyl aromatic polymer.

U.S. Pat. No. 5,760,149 issued Jun. 2, 1998 to Sanchez et al. discloses tetrafunctional (monoperoxycarbonate) compounds that are useful as initiators for olefin monomers including styrene. The patent also teaches a process for polymerizing polystyrene. However, there is no teaching in the patent of foaming the resulting polymer using extrusion techniques.

The present invention seeks to provide a novel process for extrusion foaming of styrenic polymers in which the styrenic polymer comprises less than 50 weight % of branched styrenic polymer.

SUMMARY OF THE INVENTION

The present invention provides a closed cell foam comprising from $C_{8-12}$ vinyl aromatic polymer comprising:
  i) from 60 to 100 weight % of one or more $C_{8-12}$ vinyl aromatic monomers; and
  ii) from 0 to 40 weight % of one or more monomers selected from the group consisting of $C_{1-4}$ alkyl esters of acrylic or methacrylc acid and acrylonitrile and methacrylonitrile; which polymer may be grafted onto or occluded within from 0 to 12 weight % of one or more rubbery polymers selected from the group consisting of:

iii) co- and homopolymers of $C_{4-5}$ conjugated diolefins; and iv) copolymers comprising from 60 to 85 weight % of one or more $C_{4-5}$ conjugated diolefins and from 15 to 40 weight % of a monomer selected from the group consisting of acrylonitrile and methacrylonitrile, said vinyl aromatic polymer comprising 10 to 45 weight % of a star branched polymer and having a VICAT softening temperature not less than 100° C.

In a further embodiment the present invention provides a process for preparing the above closed cell foam comprising injection into a molten mass of $C_{8-12}$ vinyl aromatic polymer comprising:

i) from 60 to 100 weight % of one or more $C_{8-12}$ vinyl aromatic monomers; and ii) from 0 to 40 weight % of one or more monomers selected from the group consisting of $C_{1-4}$ alkyl esters of acrylic or methacrylc acid and acrylonitrile and methacrylonitrile; which polymers are grafted onto from 0 to 12 weight % of one or more rubbery polymers selected from the group consisting of:

iii) co- and homopolymers of $C_{4-5}$ conjugated diolefins; and iv) copolymers comprising from 60 to 85 weight % of one or more $C_{4-5}$ conjugated diolefins and from 15 to 40 weight % of a monomer selected from the group consisting of acrylonitrile and methacrylonitrile, said polymer comprising 10 to 45 weight % of a star branched polymer and having a VICAT softening temperature not less than 100° C.; at a temperature from 140 to 235° C. and a pressure from 1500 to 3500 psi from 2 to 15 weight % of one or more blowing agents selected from the group consisting of $C_{4-6}$ alkanes, CFCs, HCFCs, HFCs, $CO_2$ and $N_2$ and maintaining said $C_{8-12}$ vinyl aromatic polymer in a molten state and thoroughly mixing said blowing agent with said polymer and extruding said mixture of blowing agent and polymer.

The present invention also provides a process for polymerizing a vinyl aromatic monomer comprising from 5 to 45 weight % of star branched vinyl aromatic polymer, comprising feeding a mixture comprising:

i) from 60 to 100 weight % of one or more $C_{8-12}$ vinyl aromatic monomers; and ii) from 0 to 40 weight % of one or more monomers selected from the group consisting of $C_{1-4}$ alkyl esters of acrylic or methacrylc acid and acrylonitrile and methacrylonitrile; which polymer may be grafted onto or occluded within from 0 to 12 weight % of one or more rubbery polymers selected from the group consisting of:

iii) co- and homopolymers of $C_{4-5}$ conjugated diolefins; and iv) copolymers comprising from 60 to 85 weight % of one or more $C_{4-5}$ conjugated diolefins and from 15 to 40 weight % of a monomer selected from the group consisting of acrylonitrile and methacrylonitrile, and from 0.01 to 0.1 weight % of a tetrafunctional peroxide initiator of the formula:

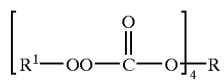

wherein $R^1$ is selected from the group consisting of $C_{4-6}$ t-alkyl radicals; and R is a neopentyl group, in the absence of a cross linking agent to a series of two or more continuous stirred tank reactors, to provide a relatively low temperature initial reaction zone at a temperature from 100 to 130° C. and a relatively higher temperature subsequent reaction zone at a temperature from 130 to 160° C. and maintaining a ratio of residence time in said relatively lower temperature reaction zone to said relatively higher temperature reaction zone from 1:1 to 3:1 and recovering the resulting polymer.

BEST MODE

As used in this specification "star branched" polymer means having multiple, preferably at least 3, most preferably 4, branches eminating from a common node.

The styrenic polymers of the present invention may be co- or homopolymers of $C_{8-12}$ vinyl aromatic monomers. Some vinyl aromatic monomers may be selected from the group consisting of styrene, alpha methyl styrene and para methyl styrene. Preferably the vinyl aromatic monomer is styrene.

The styrenic polymer may be a copolymer comprising from 60 to 100 weight % of one or more $C_{8-12}$ vinyl aromatic monomers; and from 0 to 40 weight % of one or more monomers selected from the group consisting of $C_{1-4}$ alkyl esters of acrylic or methacrylc acid and acrylonitrile and methacrylonitrile. Suitable esters of acrylic and methacrylic acid include methyl acrylate, ethyl acyrlate, butyl acrylate, methyl methacrylate, ethyl methacrylate and butyl methacrylate.

The polymers of the present invention may be rubber modified. That is the polymer may be grafted onto or occluded within from 0 to 12 weight % of one or more rubbery polymers selected from the group consisting of:

i) co- and homopolymers of $C_{4-5}$ conjugated diolefins; and ii) copolymers comprising from 60 to 85 weight % of one or more $C_{4-5}$ conjugated diolefins and from 15 to 40 weight % of a monomer selected from the group consisting of acrylonitrile and methacrylonitrile.

The rubbery polymer may be selected from a number of types of polymers. The rubbery polymer may comprise from 40 to 60, preferably from 40 to 50 weight % of one or more $C_{8-12}$ vinyl aromatic monomers which are unsubstituted or substituted by a $C_{1-4}$ alkyl radical and from 60 to 40, preferably from 60 to 50 weight % of one or more monomers selected from the group consisting of $C_{4-5}$ conjugated diolefins. Such polymers are known as the styrene butadiene rubbers (SBR). The rubber may be prepared by a number of methods, preferably by emulsion polymerization. This process is well known to those skilled in the art and described for example in Rubber Technology, Second Edition, edited by Maurice Morton, Robert E. Krieger Publishing Company Malabar, Fla., 1973, reprint 1981—sponsored by the Rubber Division of the American Chemical Society.

The rubbery polymer may be a nitrile rubber comprising from 15 to 40 weight % of one or more monomers selected from the group consisting of acrylonitrile and methacrylonitrile, preferably acrylonitrile, and from 85 to 60 weight % of one or more $C_{4-6}$ conjugated diolefins. The polymers may be prepared by a number of methods, preferably by emulsion polymerization. This process is well known to those skilled in the art and described for example in the aforementioned reference.

The rubber may be a co- or homopolymer of one or more $C_{4-6}$ conjugated diolefins such as butadiene (1,3-butadiene) or isoprene, preferably butadiene. The polybutadiene may have a molecular weight (Mw) from about 260,000 to 300,000, preferably from about 270,000 to 280,000. Polybutadiene has a steric configuration. The polymer may have a cis configuration ranging from about 50% up to 99%. Some commercially polymers have a cis content of about 55% such as TAKTENE® 550 (trademark of Bayer AG) or DIENE® 55 (trademark of Firestone). Some commercially available butadiene has a cis configuration from about 60 to 80% such as Firestone's DIENE® 70. Some high cis-butadiene rubbers may have a cis configuration of 95% or greater, preferably greater than 98% (TAKTENE® 1202).

If present, preferably the rubber is present in an amount from about 3 to 10 weight % based on the total composition fed to the reactor (i.e. monomers and rubber). Polybutadiene is a particularly useful rubber.

The process for making HIPS is well known to those skilled in the art. The rubber is "dissolved" in the styrene monomer (actually the rubber is infinitely swollen with the monomer). This results in two co-continuous phases. The resulting "solution" is fed to a reactor and polymerized typically under shear. When the degree of polymerization is about equal to the weight % of rubber in the system it inverts (e.g. the styrene/styrene polymer phase becomes continuous and the rubber phase becomes discontinuous. After phase inversion the polymer is finished in a manner essentially similar to that for finishing polystyrene.

The polymer is prepared using conventional bulk, solution, or suspension polymerization techniques. However, there is added to the first reactor (i.e. the lower temperature reactor) from about 0.01 to 0.1 weight % (100 to 1000 ppm) of a tetrafunctional peroxide initiator of the formula:

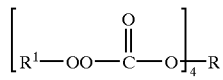

wherein $R^1$ is selected from the group consisting of $C_{4-6}$ t-alkyl radicals and R is a neopentyl group. The reaction is conducted in the absence of a cross linking agent. Preferably the tetrafunctional peroxide is present in the feed to the first reactor (i.e. the lower temperature reactor) in an amount from about 200 to 400 ppm (0.02 to 0.04 weight %), most preferably from 250 to 350 ppm (0.025 to 0.035 weight %).

Suitable tetrafunctional peroxide initiators include initiators selected from the group consisting of tetrakis-(t-amylperoxycarbonyloxymethyl) methane, tetrakis-(t-butylperoxycarbonyloxymethyl) methane, 1,2,3,4-tetrakis (t-amylperoxycarbonyloxy) butane and the tetrakis (t-$C_{4-6}$ alkyl monoperoxycarbonates). A particularly useful initiator is the compound of the above formula wherein R is a nenopentyl group and $R^1$ is a tertiary amyl or tertiary butyl radical.

Typically in a bulk or solution process the monomer mixture and optionally rubber is polymerized in at least two continuous stirred tank reactors. The first reaction temperature is kept at a relatively low temperature from about 100 to 130° C., preferably from 120 to 130° C. and then at a relatively higher temperature from about 130 to 160° C., preferably from about 135 to 145° C. In the polymerization process there are competing initiation reactions. The initiation may be thermal without the use of the initiator or it may be initiated by the peroxy carbonate initiator. The residence time in each temperature zone is controlled so that the amount of polymerization initiated thermally (which results in a linear polymer) and by the peroxy carbonate initiator (in which about half of the resulting polymer is branched) is controlled so that not more than 50 weight % of the resulting polymer is branched. For example if the reaction is controlled so that the ratio of residence time at the lower temperature to time at higher temperature is from 1:1 to 3:1, preferably from 1.5:1 to 2.5:1, most preferably about 2:1 (i.e. 1.8:1 to 2.2:1). The weight ratio of linear to star branched polymer is controlled to greater than 1:1 (e.g. greater than 50:50). Preferably, the vinyl aromatic polymer or styrenic polymer will comprise from about 10 to 45, preferably from about 15 to 40, most preferably from about 15 to 30 weight % of a star branched polymer.

In a suspension process the monomers, optionally including dissolved rubber, may be either first partially polymerized in a continuously stirred tank system. The partially polymerized monomer mixture has stabilizers or suspending agents added to it to help suspend it in the aqueous phase as an oil in water suspension. Typically the stabilizer or suspending agent is added in an amount from 0.1 to 2.0 weight %, preferably from 0.5 to 1.0 weight %.

Useful stabilizers or suspending agents are well known to those skilled in the art. Useful stabilizers or suspending agents include polyvinyl alcohol, gelatin, polyethylene glycol, hydroxyethyl cellulose, carboxymethyl cellulose, polyvinyl pyrrolidone, polyacrylamides, salts of poly (meth) acrylic acid, salts of phosphonic acids, salts of phosphoric acid and salts of complexing agents such as ethylene diamine tetraacetic acid (EDTA).

Generally the salts are ammonium, alkali and alkaline earth metal salts of the foregoing stabilizers or suspending agents. For example tricalcium phosphate is a suitable suspending agent.

The tetra functional initiator may be added to the monomer mixture prior to polymerization in the bulk or mass reactor or just prior to suspension batch polymerization in the suspension batch reactor. The suspension batch reactor is generally operated at lower temperatures than the bulk reactor. However, the suspension batch reaction is finished at higher temperatures from about 120 to 150° C., typically from about 125 to 135° C.

The resulting polymer has a number of unique properties that make it suitable for extrusion foaming and particularly suitable for extrusion foaming using inorganic blowing agents such as $CO_2$ or $N_2$. The polymer has a VICAT softening temperature (as measured by DIN 53460 is equivalent to ISO 306 is equivalent to ASTM D 1525-96) of greater than 100° C., preferably from 105° C. to 115° C. The polymer has a mean melt strength at 210° C. of not less than 12.5 cN.

The melt strength and the stretch ratio test are determined using a Rosand® Capillary Rheometer. The mean melt strength is determined by extrusion of a melt at 210° C. of the polymer through a circular 2-mm diameter flat die, length to diameter (L/D) of the die is 20:1. The strand is extruded at a constant shear rate of 20 $sec^{-1}$. The strand is attached to a haul off unit which increases in speed with time. The strand is attached to a digital balance scale to measure the force of draw on the polymer. As the speed of the haul off unit increases the draw force increases. As a result the strand breaks. The draw force immediately prior to break is defined as the melt strength. The stretch ratio is defined as the ratio of the velocity of draw to the extrusion velocity at the die exit. The test is repeated at least three times to determine an average value.

The polymer may have a melt flow at condition G (230° C./5 Kg load of less than 5 g/10 minutes, preferably less than 3 g/10 minutes, most preferably of less than 2 g/10 minutes. Additionally, the polymer has a Mz which exceeds typical high heat crystal polystyrene resins by at least 40,000, preferably by greater than 60,000.

The polymer may be foamed using conventional extrusion foaming equipment. The extruder may be a back to back type or it may be a multizoned extruder having at least a first or primary zone to melt the polymer and inject blowing agent and a second extruder or zone.

In the primary extruder or zone the polymer melt is maintained at temperatures from about 425° F. to 450° F. (about 218 to 232° C.). Once the polymer is melted, blowing agent is injected into the melt at the end of the primary extruder or zone. In the primary extruder or zone there will be a high shear zone to promote thorough mixing of the blowing agent with the polymer melt. Such a zone may comprise a number of pin mixers.

The polymer melt containing dissolved or dispersed blowing agent is then fed from the primary extruder to the secondary extruder or passes from a primary zone to a secondary zone within the extruder maintained at a melt temperature of 269° F. to 290° F. (about 132° C. to 143° C.). In the secondary extruder or zone the polymer melt and entrained blowing agent passes through the extruder barrel by the action of an auger screw having deep flights and exerting low shear upon the polymer melt. The polymer melt is cooled by means of cooling fluid, typically oil which circulates around the barrel of the extruder. Generally the melt is cooled to a temperature of from about 250° F. to about 290° F. (about 121° C. to 143° C.).

The blowing agent may be selected from the group consisting of $C_{4-6}$ alkanes, CFCs, HFCs, HCFCs, $CO_2$, $N_2$, air and mixtures thereof. The blowing agent may be $CO_2$ per se or $N_2$ per se. The blowing agent may comprise from 20 to 95 weight % of a blowing agent selected from the group consisting of one or more $C_{4-6}$ alkanes (as described below) and from 80 to 5 weight % of CFCs, HFCs and HCFC's (as described below). Suitable $C_{4-6}$ alkanes include butane, pentane and mixtures thereof.

The blowing agent may comprise from 30 to 95, preferably from 70 to 95, most preferably from 80 to 90 weight % of $CO_2$ and from 70 to 5, preferably from 30 to 5, most preferably from 20 to 10 weight % of one or more compounds selected from the group consisting of $C_{1-2}$ halogenated alkanes and $C_{4-6}$ alkanes. Suitable $C_{1-2}$ halogenated alkanes include the chlorofluorocarbons (CFCs); hydrofluorocarbons (HFCs) and the hydrochlorofluorocarbons (HCFCs) such as trichlorofluoromethane (CFC-11); dichlorodifluoromethane (CFC-12); trichlorotrifluoroethane (CFC-113); dichlorotetrafluoroethane (CFC-114); dichlorofluoromethane (CFC-21); chlorodifluoromethane (HCFC-22); difluoromethane (HFC-32); 2-chloro-1,1,1,2-tetrafluoroethane (HCFC-124); pentafluoroethane (HFC-125); 1,1,1,2-tetrafluoroethane (HCFC-124); 1,1-dichloro-1-fluoroethane (HCFC-141b); 1-chloro-1,1-difluoroethane (HCFC-142b); trifluoroethane (HFC-143a); 1,1-difluoroethane (HFC-152a); tetrafluoroethane (HFC-134a); and dichloromethane. However, due to environmental concerns it is preferred to use alkanes such as $C_{4-6}$ alkanes which have not been halogenated such as butane, pentane, isopentane and hexane. The blowing agent system may be used in amounts from 2 to 15, preferably from 2 to 10, most preferably from about 3 to 8 weight % based on the weight of the polymer.

The pressure within the extruder should be sufficient to keep the blowing agent in the polymer melt. Typically, the pressures in the melt after the blowing system has been injected will be from about 1500 to 3500 psi, preferably from about 2000 to about 2500 for $CO_2$. The $CO_2$ and the other blowing agent may be injected separately into the melt. If this is done, preferably the alkane and/or halogenated alkane will be injected upstream of the $CO_2$ as these types of blowing agents have a plasticizing effect on the polymer melt which may help the $CO_2$ go into the melt. The alkane blowing agent and the $CO_2$ may also be mixed prior to injection into the extruder as is disclosed in U.S. Pat. No. 4,424,287 issued Jan. 3, 1984 assigned to Mobil Oil Corporation.

To improve the cell size and/or distribution throughout the polymer small amounts of a nucleating agent may be incorporated into the polymer blend or solution. These agents may be physical agents such as talc or they may be agents which release small amounts of $CO_2$ such as citric acid and alkali or alkaline earth metal salts thereof and alkali or alkaline earth metal carbonates or bicarbonates. Such agents may be used in amounts from about 500 to 5,000 ppm, typically from about 500 to 2,500 ppm based on the polymer melt or blend.

The polymer melt or blend may also contain the conventional additives such as heat and light stabilizers (e.g. hindered phenols and phosphite or phosphonite stabilizers) typically in amounts of less than about 2 weight % based on the polymer blend or solution.

The foam is generally extruded at atmospheric pressure and as a result of the pressure release on the melt, the melt foams. The foam is cooled to ambient temperature typically below about 25° C., which is below the glass transition temperature of the polymer and the foam is stabilized. One of the advantages of the present invention is that the foamed polymer melt has better melt strength than the foamed polymer melts of the prior art and there is less foam collapse.

The foam may be extruded onto rollers as a relatively thick slab typically from about 1 to 3 inches thick. The foam density may vary from 2 to 15 lbs/ft³ (from about 0.03 to 0.24 g/cm³). The slab is cut into appropriate lengths (8 feet) and is generally used in the construction industry. Thinner foams, typically from about 1/16 to about 1/4 inches (62 to 250 mils) thick may be extruded as slabs or as thin walled tubes which are expanded and oriented over an expanding tubular mandrel to produce a foam tube which is slit to produce sheet. These relatively thin sheets are aged, typically 3 or 4 days and then may be thermoformed into items such as coffee cups, meat trays or "clam shells".

The present invention will now be illustrated by the following non-limiting examples in which, unless otherwise indicated parts means parts by weight (grams) and percent means weight percent.

EXAMPLE 1

Polymer Preparation

Styrene monomer and 0.028 weight % of a tetra t-alkylperoxy carbonate sold by Ato Chemie under the trade mark JWEB50 were first fed into a continuously stirred tank reactor maintained at 120° C. The residence time in the first reactor was about 2.5 hours. The partially polymerized mixture from the first reactor was then fed to a second continuously stirred tank reactor maintained at 140° C. The residence time in the second reactor was about 1 hour. The resulting polymer was then devolatilized in a falling strand devolatilizer and recovered and pelletized.

The reaction conditions were such that about 64% of the polymer was thermally initiated and linear. About 36% of the polymer was initiated by the peroxide and about half of the resulting polymer was star branched. The polymer had an Mz from 40,000 to 75,000 greater than conventional high heat crystal.

EXAMPLE 2

The procedure of Example 1 was repeated except that the amount of initiator was 0.045 weight %.

EXAMPLE 3

The procedure of Example 1 was repeated except that zinc stearate was also included in the polymer in an amount of about 0.1 weight %.

Physical Properties

The physical properties of the resins prepared in Examples 1, 2 and 3 were compared to NOVA Chemicals' VEREX™ 1280 resin and 1230 polystyrene resin (both linear crystal polystyrene resins used in extrusion foam applications), and a Dow resin sold for use in extrusion foam applications. The results are set forth in Table 1.

EXAMPLE 4

The above samples together with the reference samples were extrusion foamed using pentane as the blowing agent. The average cell diameter of the foam was measured. The results are set out in Table 2.

The foams extruded well and the cell data suggests that the foam stability good. The resulting foams have good toughness.

TABLE 1

| | Polystyrene Sample Identification | | | | | |
|---|---|---|---|---|---|---|
| Initiator: polyether tetrakis (t-butylperoxy carbonate) | Example 1 280 ppm Initiator | Example 2 450 ppm Initiator | Example 3 280 ppm Initiator + Zn | VEREX 1280 | VEREX 1230 | DOW RESIN |
| Mw | 351,000 | 345,000 | 342,000 | 306,000 | 309,000 | 310,000 |
| Mn | 132,000 | 113,000 | 141,000 | 77,000 | 102,000 | 130,000 |
| Mz | 638,000 | 659,000 | 606,000 | 535,000 | 551,000 | 550,000 |
| Polydispersity (Mw/Mn) | 2.66 | 3.05 | 2.42 | 3.97 | 3.03 | 2.38 |
| Mean Melt Strength (cN) @ 190° C. | 38.21 | 36.95 | 37.44 | 31.07 | 30.42 | 34.7 |
| Mean Stretch Ratio (%) @ 190° C. | 91.8 | 81 | 79.9 | 84.3 | 99.4 | 91.8 |
| Mean Peak Melt Strength @ 190° C. | 45.25 | 45.73 | 43.7 | 38.74 | 34.75 | 39.73 |
| Mean Melt Strength (cN) @ 210° C. | 14.11 | 14 | 14.56 | 10.25 | 11.02 | 11.95 |
| Mean Stretch Ratio (%) @ 210° C. | 279.6 | 230.3 | 236.5 | 428.6 | 399.4 | 326 |
| Mean Peak Melt Strength @ 210° C. | 17.43 | 17.02 | 17.73 | 12.22 | 12.87 | 14.43 |
| Notched Izod (ft-lb/in) | 0.36 | 0.32 | 0.34 | 0.33 | 0.32 | 0.22 |
| Melt Flow Condition "G" (g/10 min) | 1.35 | 1.74 | 1.4 | 1.98 | 2.07 | 1.42 |
| VICAT (° C.) | 108.4 | 109 | 108.9 | 108.2 | 108.6 | 109.9 |

TABLE 2

| | Polystyrene Sample Identification | | | | | |
|---|---|---|---|---|---|---|
| Initiator: polyether tetrakis (t-butylperoxy carbonate) | Example 1 280 ppm Initiator | Example 2 450 ppm Initiator | Example 3 280 ppm Initiator + Zn | Verex 1280 | Verex 1230 | Dow Resin |
| Isopentane fed to foam process (wt %) | 5 | 5 | 5 | 5 | 5 | 5 |
| Test Results on 2S Type Foamed Meat Trays Molded From Polystyrene Samples | | | | | | |
| Mean Load at Max Load (lbs) | 2.44 | 2.56 | 2.84 | 3.2 | 2.88 | 2.96 |
| Mean Displacement at Max Load (in.) | 2.16 | 1.92 | 1.46 | 1.71 | 2.13 | 2.28 |
| Mean Load at 1.5" Deflection (lbs) | 2.2 | 2.44 | 2.82 | 3.16 | 2.67 | 2.62 |
| Mean Slope (lbs/in) | 3.02 | 3.86 | 3.58 | 3.74 | 3.61 | 3.47 |
| Mean Part Weight (grams) | 4.521 | 4.595 | 4.59 | 4.96 | 4.758 | 4.93 |
| Mean Sidewall Thickness (inches) | 0.091 | 0.087 | 0.105 | 0.102 | 0.103 | 0.098 |
| Mean Foam Density (lbs/ft$^3$) | 3.2 | 3.56 | 2.92 | 3.07 | 3.02 | 3.194 |
| Mean Orientation MD (%) | 55.93 | 57.48 | 56.07 | 54.4 | 56.68 | 54.49 |
| Mean Orientation TD (%) | 57.15 | 57.2 | 56.55 | 54.73 | 56.47 | 52.29 |
| Number of Cells Across Sheet Thickness (TD) | 21 | 20 | 38 | 22 | 31 | 23 |
| Average Cell Diameter (mm) | 0.1101 | 0.1105 | 0.0702 | 0.1178 | 0.0844 | 0.1082 |
| Number of Parts With Sidewall Cracks | 0 | 1 | 0 | 3 | 0 | 2 |
| Cell Structure | | coarse | fine | coarse | | coarse |
| Cell Shape | slight elongation | slight elongation | spherical | spherical | spherical | spherical |
| Corner Inversion Test on Trays - Failure Rate/20 | 0 | 3 | 0 | 2 | 0 | 6 |

What is claimed is:

1. A closed cell foam comprising from $C_{8-12}$ vinyl aromatic polymer comprising:

i) from 60 to 100 weight % of one or more $C_{8-12}$ vinyl aromatic monomers; and ii) from 0 to 40 weight % of one or more monomers selected from the group consisting of $C_{1-4}$ alkyl esters of acrylic or methacrylc acid and acrylonitrile and methacrylonitrile; which polymer may be grafted onto or occluded within from 0 to 12 weight % of one or more rubbery polymers selected from the group consisting of:

iii) co- and homopolymers of $C_{4-5}$ conjugated diolefins; and iv) copolymers comprising from 60 to 85 weight % of one or more $C_{4-5}$ conjugated diolefins and from 15 to 40 weight % of a monomer selected from the group consisting of acrylonitrile and methacrylonitrile, said vinyl aromatic polymer comprising 10 to 45 weight % of a star branched polymer and having a VICAT softening temperature not less than 100° C.

2. The closed cell foam according to claim 1, wherein the star branched vinyl aromatic polymer is present in an amount from 15 to 40 weight % of the vinyl aromatic polymer.

3. The closed cell foam according to claim 2, having a mean melt strength at 210° C. of not less than 12.5 cN.

4. The closed cell foam according to claim 2, wherein the vinyl aromatic polymer has a VICAT softening temperature from 105 to 115° C.

5. The closed cell foam according to claim 4, wherein the $C_{8-12}$ vinyl aromatic monomer is selected from the group consisting of styrene, alpha methyl styrene and para methyl styrene.

6. The closed cell foam according to claim 5, wherein the vinyl aromatic polymer is prepared by solution or bulk polymerization in the presence of from 0.01 to 0.1 weight % of a tetra functional peroxide initiator of the formula:

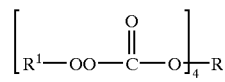

wherein $R^1$ is selected from the group consisting of $C_{4-6}$ t-alkyl radicals and R is a neopentyl group, in the absence of a cross linking agent.

7. The closed cell foam according to claim 4, wherein the $C_{8-12}$ vinyl aromatic monomer is selected from the group consisting of styrene, alpha methyl styrene and para methyl styrene.

8. The closed cell foam according to claim 7, wherein the $C_{8-12}$ vinyl aromatic polymer is a homopolymer.

9. The closed cell foam according to claaim 8, wherein the $C_{8-12}$ vinyl aromatic polymer is polystyrene.

10. The closed cell foam according to claim 9, wherein the tetrafunctional initiator is selected from the group consisting of tetrakis-(t-amylperoxycarbonyloxymethyl) methane, and tetrakis-(t-butylperoxycarbonyloxymethyl) methane.

11. The closed cell foam according to claim 10, having a melt flow at condition G of less than 2.5 g 10 minutes.

12. The closed cell foam according to claim 11, wherein the rubbery polymer is present in an amount from 3 to 10 weight %.

13. The closed cell foam according to claim 11, wherein the rubbery polymer is present in an amount from 3 to 10 weight %.

* * * * *